United States Patent
Lim et al.

(10) Patent No.: US 8,229,519 B2
(45) Date of Patent: Jul. 24, 2012

(54) MOBILE COMMUNICATION TERMINAL AND METHOD OF CHANGING A FUNCTION MODE

(75) Inventors: Sang Yeon Lim, Seongnam-si (KR); Young Suk Oh, Daejeon-si (KR)

(73) Assignee: LG Electronics Inc., Seoul (KR)

( * ) Notice: Subject to any disclaimer, the term of this patent is extended or adjusted under 35 U.S.C. 154(b) by 1143 days.

(21) Appl. No.: 11/780,310

(22) Filed: Jul. 19, 2007

(65) Prior Publication Data

US 2008/0020811 A1    Jan. 24, 2008

(30) Foreign Application Priority Data

Jul. 20, 2006    (KR) .................. 10-2006-0068114

(51) Int. Cl.
*H04M 1/00* (2006.01)
(52) U.S. Cl. .................. 455/575.1; 455/575.4
(58) Field of Classification Search ... 455/575.14–575.3
See application file for complete search history.

(56) References Cited

U.S. PATENT DOCUMENTS

| | | | |
|---|---|---|---|
| 4,237,540 A * | 12/1980 | Sato | 708/108 |
| 7,283,841 B2 * | 10/2007 | Luke et al. | 455/556.1 |
| 7,315,291 B2 * | 1/2008 | Yoshihara et al. | 345/1.1 |
| 7,443,404 B2 * | 10/2008 | Kawamoto et al. | 345/660 |
| 7,551,945 B2 * | 6/2009 | Okada et al. | 455/566 |
| 2004/0179330 A1 * | 9/2004 | Lee et al. | 361/679 |
| 2005/0164745 A1 * | 7/2005 | Oe et al. | 455/566 |
| 2005/0277439 A1 * | 12/2005 | Brelo et al. | 455/556.2 |
| 2006/0050168 A1 * | 3/2006 | Okada et al. | 348/333.06 |
| 2006/0051083 A1 * | 3/2006 | Yamamoto | 396/287 |
| 2006/0105806 A1 * | 5/2006 | Vance et al. | 455/556.1 |
| 2006/0111160 A1 | 5/2006 | Lin et al. | |
| 2006/0121947 A1 * | 6/2006 | Lee | 455/566 |
| 2007/0076861 A1 * | 4/2007 | Ju | 379/433.01 |
| 2007/0159362 A1 * | 7/2007 | Shen | 341/20 |
| 2007/0249389 A1 * | 10/2007 | Hotta | 455/552.1 |
| 2007/0298850 A1 * | 12/2007 | Miyata et al. | 455/575.3 |

FOREIGN PATENT DOCUMENTS

| | | |
|---|---|---|
| EP | 01564968 | 8/2005 |
| EP | 01675358 | 6/2006 |
| EP | 1675358 A1 | 6/2006 |
| EP | 1564968 A1 | 8/2006 |
| JP | 2003-008695 | 1/2003 |
| JP | 2006-004061 | 1/2006 |
| JP | 2006-067341 | 3/2006 |
| KR | 20050083920 | 8/2005 |
| WO | WO 2005117400 A1 * | 12/2005 |
| WO | WO 2006/022383 A1 | 3/2006 |
| WO | WO 2006046681 A1 * | 5/2006 |

* cited by examiner

*Primary Examiner* — Jinsong Hu
*Assistant Examiner* — Nathan Taylor
(74) *Attorney, Agent, or Firm* — Lee, Hong, Degerman, Kang & Waimey

(57) ABSTRACT

A mobile communication terminal and method of changing a function mode are provided. The present invention provides a user interface capable of changing its function according to a rotation of a body of the mobile communication terminal. The present invention includes a first body having a display unit, a second body, a connecting part connecting the first and second bodies together to enable the first and second bodies to mutually rotate centering on a prescribed axis, and a control unit arranged to change a function by determining a relative rotation direction between the first and second bodies, and to display an image corresponding to the changed function on the display unit.

9 Claims, 8 Drawing Sheets

(a)

(b)

(a) 0° Rotation (b) 90° Rotation (c) 180° Rotation (d) 360° Rotation

MOBILE COMMUNICATION TERMINAL AND METHOD OF CHANGING A FUNCTION MODE

CROSS REFERENCE TO RELATED APPLICATIONS

Pursuant to 35 U.S.C. §119(a), this application claims the benefit of earlier filing date and right of priority to Korean Patent Application No. 10-2006-0068114 filed on Jul. 20, 2006, the contents of which is hereby incorporated by reference herein in its entirety.

FIELD OF THE INVENTION

The present invention is directed to a mobile communication terminal, and more particularly, to a mobile communication terminal and method of changing a function mode thereof. Although the present invention is suitable for a wide scope of applications, it is particularly suitable for providing a new conceptional user interface capable of changing its function mode according to a rotation of a body and facilitating keeping the configuration or handling of the mobile communication terminal.

DISCUSSION OF THE RELATED ART

Generally, mobile communication terminals can be classified into a bar type, a folder type, a slide type, a swing type and the like. And, these four types are tending to merge together to meet various user tastes and to facilitate various functions provided by the mobile communication terminals.

A mobile communication terminal generally consists of two bodies except the bar type mobile communication terminal. The folder, slide or swing type mobile communication terminal is configured to change relative positions of two bodies according to relative rotations of the two bodies.

Yet, the related art mobile communication terminal is unable to automatically change a function provided to a user according to the relative position variations of the two bodies. In some cases, the related art mobile communication terminal may have very limiting functional variations according to the relative position variations of the two bodies. For example, the mobile communication terminal enters a standby mode from a power saving mode according to a relative position variation of the two bodies. As another example, the mobile communication terminal enters a horizontal viewing mode from a vertical viewing mode according to a relative position variation of the two bodies.

However, these very limiting functional variations are insufficient to provide a user within new convenience and fun in using the mobile communication terminal.

SUMMARY OF THE INVENTION

Accordingly, the present invention is directed to a mobile communication terminal and method of changing a function mode thereof that substantially obviates one or more problems due to limitations and disadvantages of the related art.

To achieve these objects and other advantages and in accordance with the purpose of the invention, as embodied and broadly described herein, a mobile communication terminal according to the present invention includes a first body having a display unit, a second body, a connecting part connecting the first and second bodies together to enable the first and second bodies to mutually rotate centering on a prescribed axis, and a control unit arranged to change a function by considering a relative rotation direction between the first and second bodies, and to display an image corresponding to the changed function mode on the display unit.

In another aspect of the present invention, a mobile communication terminal includes a first body having a display unit, a second body, a connecting part connecting the first and second bodies together to enable the first and second bodies to mutually rotate by 360° centering on a prescribed axis, and a control unit arranged to change a function by considering a relative rotation direction between the first and second bodies and to display an image corresponding to the changed function mode of the display unit.

In another aspect of the present invention, in a mobile communication terminal including first and second bodies mutually connected rotatably against each other centering on a prescribed axis, a method of changing a function mode includes the steps of detecting a relative rotation direction and angle between the first and second bodies, changing the function provided by the mobile communication terminal according to the rotation angle between the first and second bodies, and displaying an image matching the changed function on a display unit of the mobile communication terminal.

In another aspect of the present invention, a method of changing a function in a mobile communication terminal including first and second bodies mutually connected and rotatable against each other centering on a prescribed axis, includes the steps of determining a relative rotation between the first and second bodies, detecting an input unit provided to one of a plurality of exposed faces of the second body aligned parallel to a display unit, the display unit being provided to one of a plurality of exposed faces of the first body according to the detected relative rotation, activating the function mode matching the detected input unit, and displaying an image matching the activated function mode of the display unit.

In still another aspect of the present invention, a mobile communication terminal includes a first body having a display unit, a second body having an input unit having a prescribed function assigned thereto, the input unit provided to at least one of a plurality of exposed faces of the second body, a connecting part connecting the first and second bodies to mutually rotate by 360° centering on a prescribed axis, a control unit arranged to activate the function assigned to the input unit provided to the exposed face parallel to the display unit, according to a relative rotation between the first and second bodies, and a rotation direction unit configured to determine the rotation angle between the first and second bodies.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
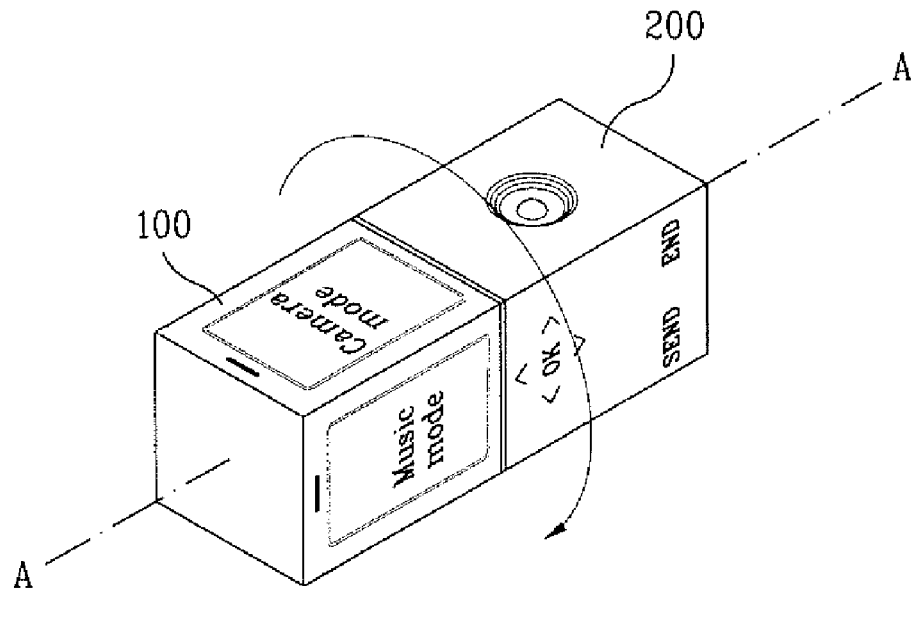
FIG. 1 is a perspective diagram of a mobile communication terminal according to one embodiment of the present invention.
Figure 1:
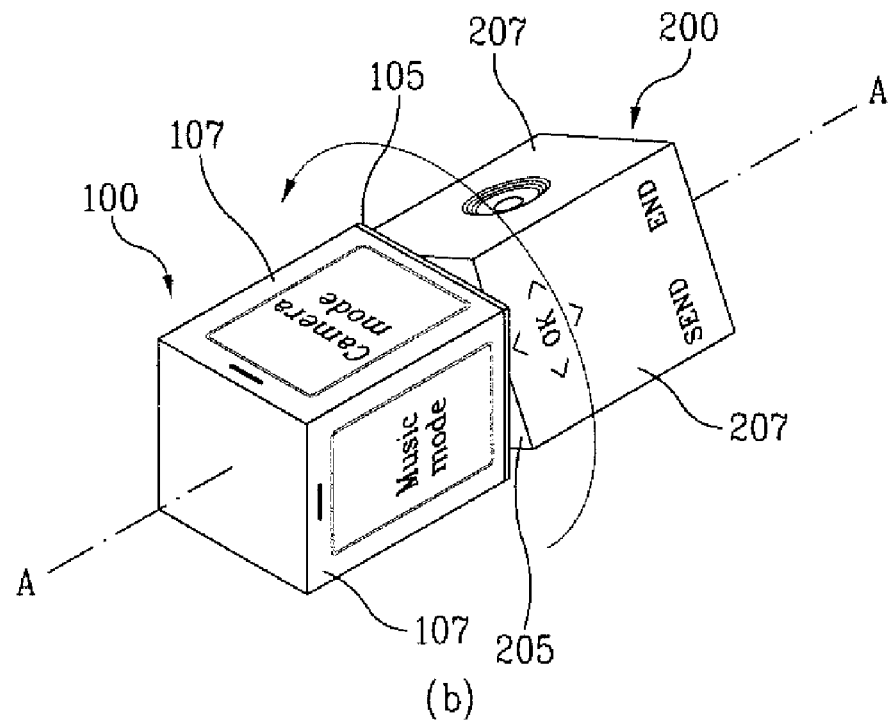

A mobile communication terminal according to one embodiment of the present invention is explained in detail with reference to FIG. 1 and FIG. 2 as follows. FIG. 1 is a perspective diagram of a mobile communication terminal according to one embodiment of the present invention, and FIG. 2 is a block diagram of a mobile communication terminal according to one embodiment of the present invention.

Figure 2:
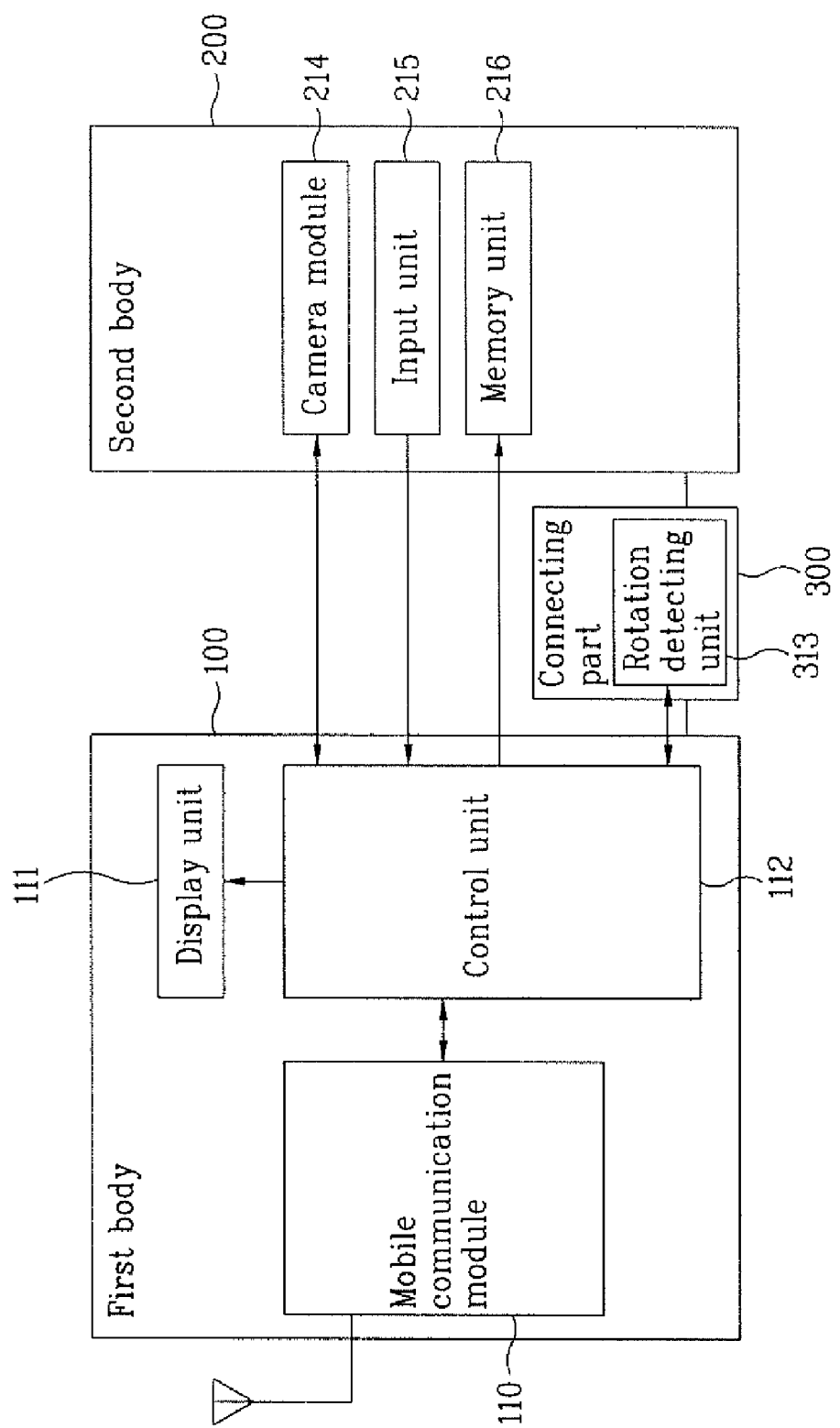
FIG. 2 is a block diagram of a mobile communication terminal according to one embodiment of the present invention.

As illustrated in FIG. 1 and FIG. 2, mobile communication terminal according to one embodiment of the present invention includes a first body 100, a second body 200 and a connecting part 300 connecting the first and second bodies 100 and 200 together to enable a relative rotation between the connected first and second bodies 100 and 200 centering on a prescribed axis A-A.

Preferably, the prescribed axis A-A, as shown in FIG. 1, commonly penetrates the first and second bodies 100 and 200. Correspondent faces 105 and 205 of the connected first and second bodies 100 and 200 are equilateral polygons equal to each other, respectively. If each of the correspondent faces 105 and 205 is configured with the equilateral polygon, keeping the corresponding configuration and handling of the mobile communication terminal are facilitated according to the relative rotation between the first and second bodies 100 and 200, irrespective of the relative positions of the first and second bodies 100 and 200.

If each of the correspondent faces 105 and 205 is configured with the equilateral polygon, each externally exposed face 107 and 207 of the first or second body 100 or 200, as shown in FIG. 1, is considerably wide so that a plurality of different type input units can be provided thereto. The mobile communication terminal shown in FIG. 1 has pairs of correspondent faces 105 and 205 that are of equal size squares.

The mobile communication terminal according to one embodiment of the present invention may further include a position fixing structure (not shown) for aligning the first and second bodies 100 and 200 to a position at which the correspondent faces 105 and 205 coincide with each other if the first and second bodies 100 and 200 are relatively rotated. Furthermore, the position fixing structure plays a role in preventing the first and second bodies 100 and 200 from being randomly rotated unless a prescribed force necessary for the relative rotations of the first and second bodies 100 and 200 is applied.

Configurations for the first and second bodies 100 and 200 when mutually rotated by the connecting part 300 are explained, by way of example as follows.

Figure 3:
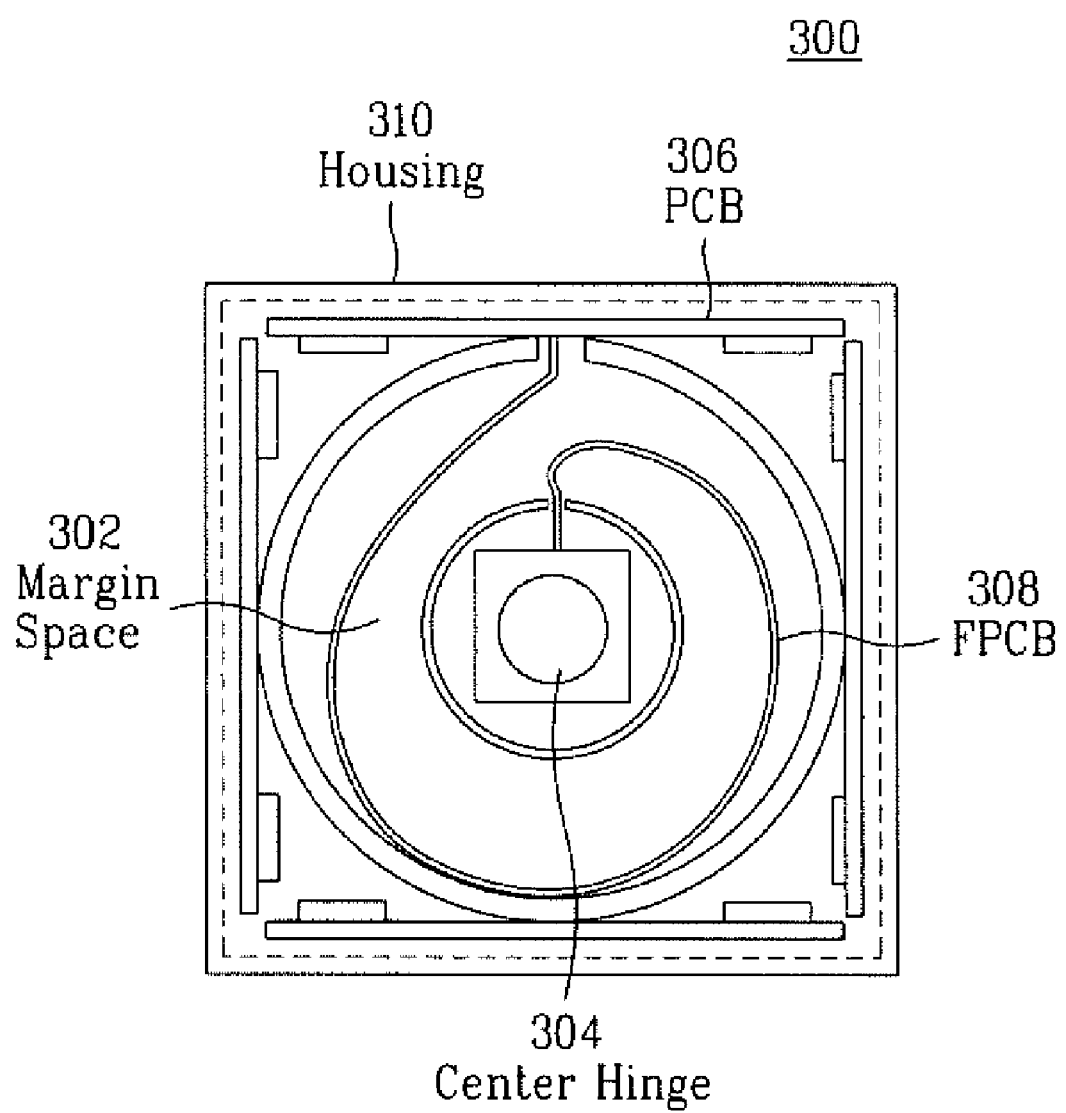
FIG. 3 is a cross-sectional diagram of a mobile communication terminal illustrating a rolling system.

FIG. 3 is a cross-sectional diagram of a mobile communication terminal according to one embodiment of the present invention, in which a rolling system is illustrated.

Referring to FIG. 3 a margin space 302 is provided, within a housing 310 of the first or second bodies 100 and 200, between a center hinge 304 and a main board PCB (printed circuit board) 306. FPCB (flexible PCB) 308 is connected to the center hinge 304 and is wound according to relative rotations of the first and second bodies 100 and 200 within the margin space 302. According to the rolling system, the first and second bodies 100 and 200 are able to mutually rotate 360°. A rotational angle is variable according to the margin space 302 between the center hinge 304, the main board PCB 306 and the FPCB 308.

Figure 4:
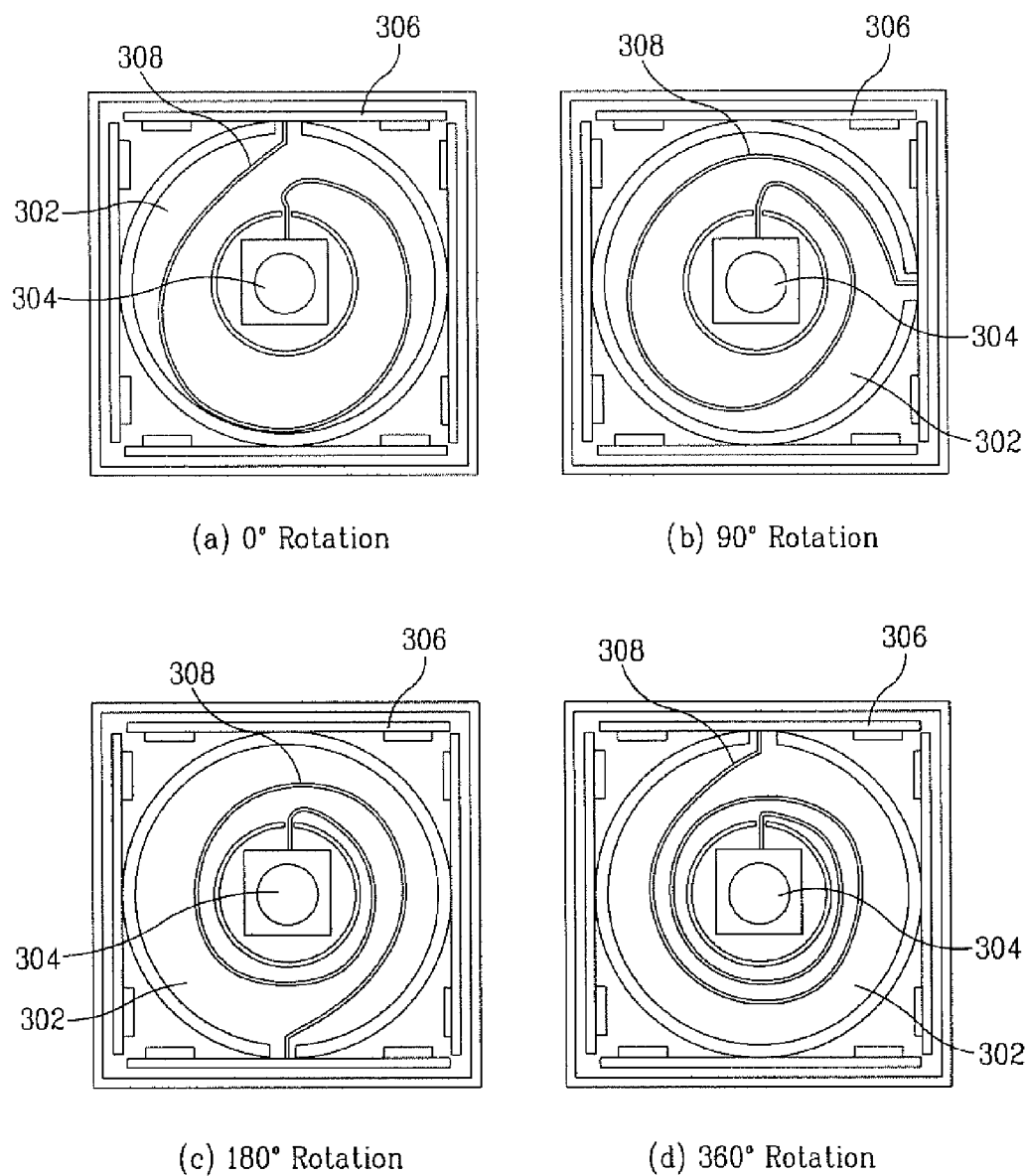
FIG. 4 is a cross-sectional diagram of a mobile communication terminal illustrating a rolling system in which a FPCB is wound.

FIG. 4 is a cross-sectional diagram of a mobile communication terminal according to one embodiment of the present invention, in which the FPCB 308 is wound according to a rolling system. Referring to FIG. 4, the first and second bodies 100 and 200 are rotated by 0° (a), 90° (b), 180° (c) or 360° (d) in one direction.

Figure 5:
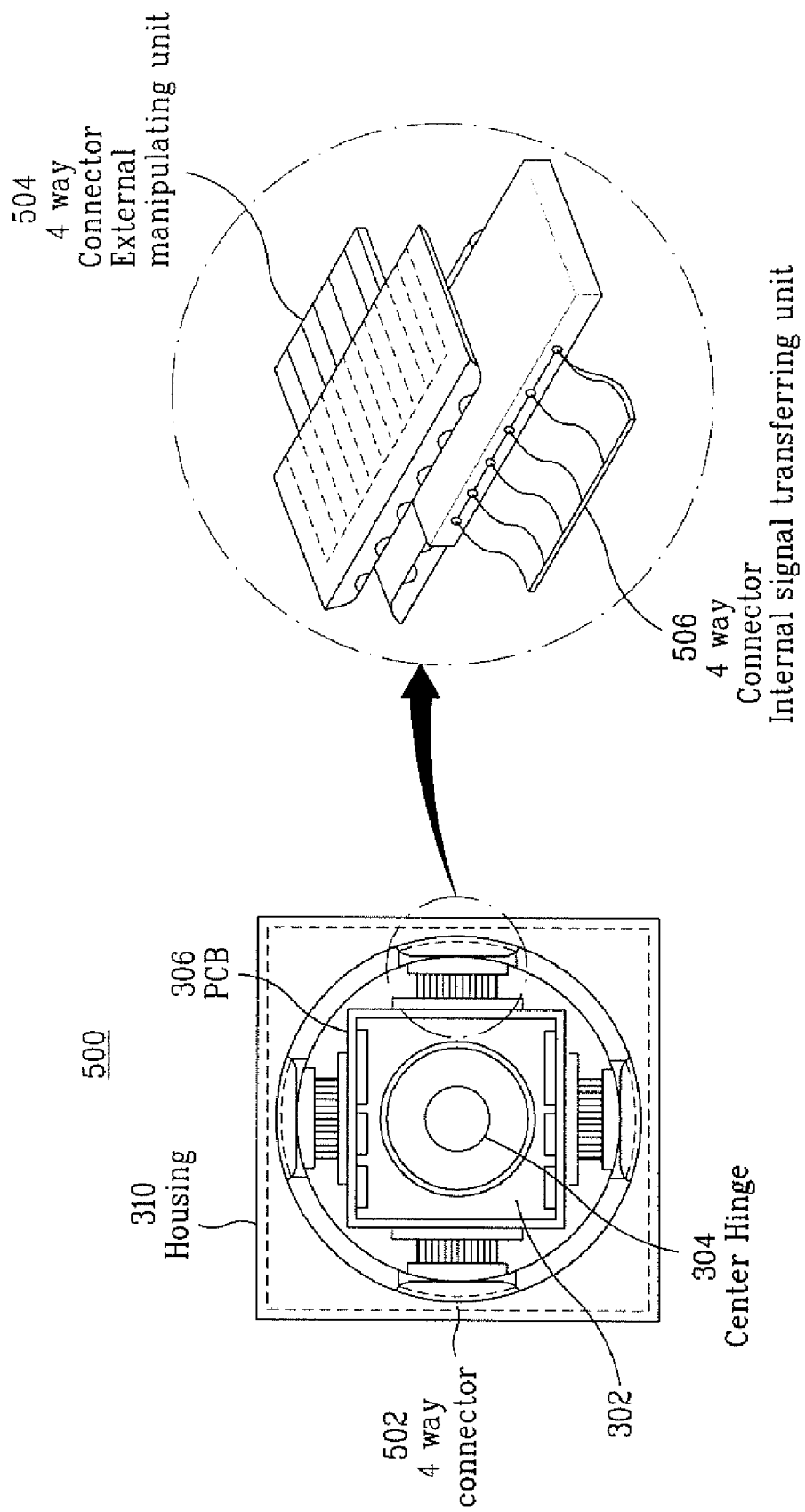
FIG. 5 is a cross-sectional diagram of a mobile communication terminal illustrating a 4-way connect system.

FIG. 5 is a cross-sectional diagram of a mobile communication terminal according to another embodiment of the present invention, in which a 4-way connect system 500 is shown.

Referring to FIG. 5, the 4-way connect system 500 changes a contact point according to relative rotations of the first and second bodies 100 and 200 by providing connectors 502 to 4-way cross-sections, respectively. Each of the 4-way connectors 502, as shown in the magnified diagram FIG. 5, includes an external manipulating unit 504 and an internal signal transferring unit 506. According to the 4-way connect system 502, a maximum rotational angle can be infinite.

As illustrated in FIG. 2, the mobile communication terminal according to one embodiment of the present invention includes a mobile communication module 110, a display unit 111, a control unit 112, a rotation detecting unit 113, a camera module 214, an input unit 215 and a memory unit 216.

Although the mobile communication module 110, the display unit 111, the control unit 112, the camera module 214, the input unit 215 or the memory unit 216 as illustrated as part of the second body 200, they may also be provided as part of the first body 100.

Moreover, the rotation detecting unit 313, illustrated as part of the connecting part 300 in FIG. 2, can be provided as part of either the first body 100 or the second body 200.

Accordingly, it is apparent that the mobile communication module 110, the display unit 111, the control unit 112, the rotation detecting unit 313, the camera module 214, the input unit 215 or the memory unit 216 do not need to be provided as part of the first, second body or connection part 100, 200 or 300 in the same manner illustrated in FIG. 2.

In the present invention, the mobile communication 110 is a communication device adapted to exchange data in a mobile communication terminal. The display unit 111 is a display device adapted to display various kinds of information or states of the mobile communication terminal. The control unit 112 controls overall operations of the mobile communication terminal according to the present invention. The rotation detecting unit 313 detects a relative rotation between the first and second bodies 100 and 200 and then delivers an indication of a direction and degree of the relative rotation to the control unit 112. The camera module 214 is a photographing device including a lens and an image sensor. The camera module 214 is detachable from the mobile communication terminal. The input unit 215 is an input device adapted to receive various information or commands from a user and can be implemented with a keypad, a touch pad or a touch screen.

The memory unit 216 stores a prescribed program for controlling overall operations of the mobile communication terminal according to the present invention. Moreover, the memory unit 216 stores various kinds of exchanged or handled data when the control unit performs overall operations of the mobile communication terminal.

The mobile communication terminal according to one embodiment of the present invention is explained with reference to operations of the control unit 112 as follows.

The control unit 112 changes a function mode by considering at least one of a relative rotation direction between the first and second bodies 100 and 200 and a relative rotation degree between the first and second bodies 100 and 200. The control unit 112 controls an image corresponding to the changed function mode to be displayed on the display unit 111. The image corresponding to the changed function mode includes a menu corresponding to the changed function mode. The change of the function mode according to the relative rotation direction and the relative rotation angle can be set in various positions by a user.

The function mode is one of a plurality of functions provided by the mobile communication terminal according to the present invention. As an example of the function mode, there is a communication mode for connecting a call via a mobile communication network, a message mode for exchanging messages by SMS (short message service) or MMS (multimedia message service) via a mobile communication network, a music mode for playing a music file such as MP3, and a camera mode for photographing a still picture or a moving picture using the camera module 214.

Moreover, the mobile communication terminal according to the present invention is able to provide various functions including a position information providing function by a radio positioning system such as GPS (global positioning system), a navigation function, a moving picture driving function, a wireless internet access function via mobile communication network and the like.

Figure 6:
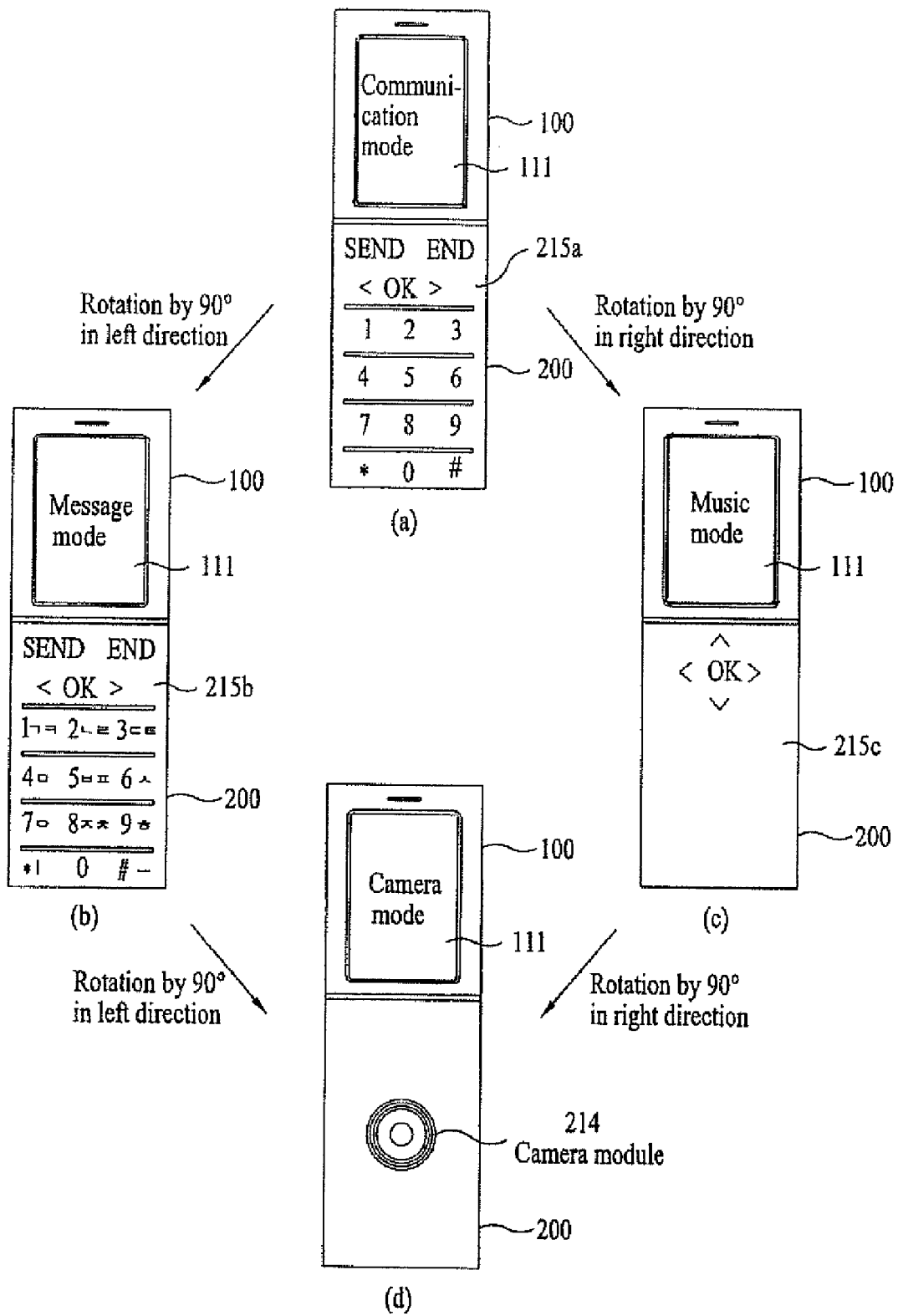
FIG. 6 is a diagram illustrating a changed function according to a relative body rotation.

FIG. 6 is a diagram for illustrating a changed function according to a relative body rotation, in which 6(a), 6(b), 6(c) and 6(d) indicate a communication mode, a message mode, a music mode and a camera mode, respectively. Examples of function mode variations of the mobile communication terminal according to the present invention are explained as follows.

As illustrated, in FIG. 6(a) if the second body 200 is rotated against the first body 100 by 90° in a left direction, the message mode shown in FIG. 6(b) is entered. And, an image matching the entered message mode is displayed on the display unit 111. The image matching the message mode can be set up by a user. For example, a menu associated with a message exchanging function provided by the mobile communication terminal according to the present invention can be displayed.

In another example, in FIG. 6(a) if the second body 200 is rotated against the first body 100 by 90° in a right direction, the music mode shown in FIG. 6(c) is entered. And, an image matching the entered music mode is displayed on the display unit 111. For example, the image matching the music mode includes an image representing a menu associated with the music mode such as a music file search, a music file play and the like.

If the second body 200 is rotated against the first body 100 by 90° in a left direction in the message mode shown in FIG. 6(b) or if the second body 200 is rotated against the first body 100 by 90° in a right direction in the music mode shown in FIG. 6(c), the camera mode shown in FIG. 6(d) is entered. And, an image matching the entered camera mode, as shown in FIG. 6(d), is displayed on the display unit 111. For example, the image matching the camera mode includes a menu associated with camera functions or a camera preview image.

Accordingly, the mobile communication terminal is able to provide each exposed face of the second body 200 with an input unit having at least one function mode assigned thereto. Specifically, different input units can be provided to a plurality of exposed faces of the second body 200, respectively. For example, an input unit 215a shown in FIG. 6(a) includes numeral keys suitable for the communication mode only. An input unit 215b shown in FIG. 6(b) includes numeral and character keys suitable for the message mode only. And, an input unit 215c shown in FIG. 6(c) includes an direction keys suitable for the music mode only.

Furthermore, it is not mandatory for the input unit 215a, 215b or 215c to include a keypad. Instead, the input unit 215a, 215b or 215c can be included on a touch pad.

A mobile communication terminal according to another embodiment of the present invention is explained in detail with reference to FIGS. 1 to 6 for operations of the control unit 112.

In accordance with this embodiment of the present invention, the first body 100 includes the display unit 111, whereas the second body 200 includes an input unit having prescribed function modes assigned to at least one exposed face of the second body 200.

The control unit 112 controls to activate a function mode which is assigned to an exposed face being aligned parallel to the display unit 111, according to a relative rotation between the first and second bodies 100 and 200. In this case, the control unit 112 is able to change the function mode by considering at least one of a relative rotation degree between the first and second bodies 100 and 200 and a relative rotation direction between the first and second bodies 100 and 200.

For example, in the communication mode shown in FIG. 6(a), if the second body 200 is rotated against the first body 100 by 90° in a left direction, the message mode, as shown in FIG. 6(b), is activated since the message mode is assigned to the input unit 215b provided to the exposed face aligned parallel to the display unit 111.

Moreover, in the communication mode shown in FIG. 6(a), if the second body 200 is rotated against the first body 100 by 90° in a right direction, the music mode, as shown in FIG. 6(c), is activated since the music mode is assigned to the input unit 215c provided to the exposed face aligned parallel to the display unit 111.

A method of changing a function mode in a mobile communication terminal according to one embodiment of the present invention is explained in detail with reference to FIG. 7 below. This method can be implemented by the mobile communication terminal illustrated in FIGS. 1 to 6.

Figure 7:
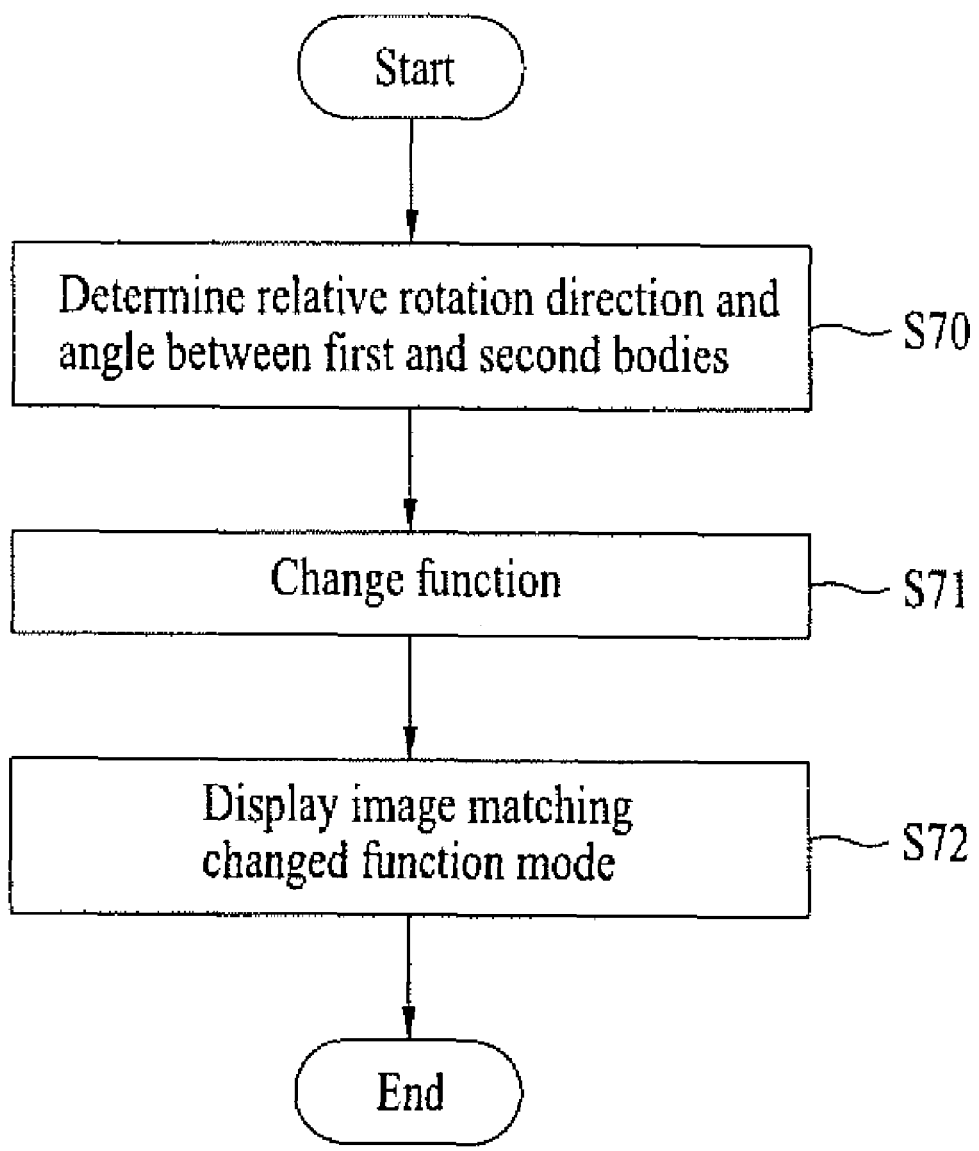
FIG. 7 is a flowchart of a method of changing a function in a mobile communication terminal according to one embodiment of the present invention.

FIG. 7 is a flowchart of a method of changing a function in a mobile communication terminal according to one embodiment of the present invention. Referring to FIG. 7, a relative rotation direction and angle between the first and second bodies 100 and 200 are determined (S70).

According to the detected relative rotation direction and angle, a function mode provided by the mobile communication terminal is changed (S71). And, an image matching the changed function mode is displayed on the display unit 111 (S72).

Figure 8:
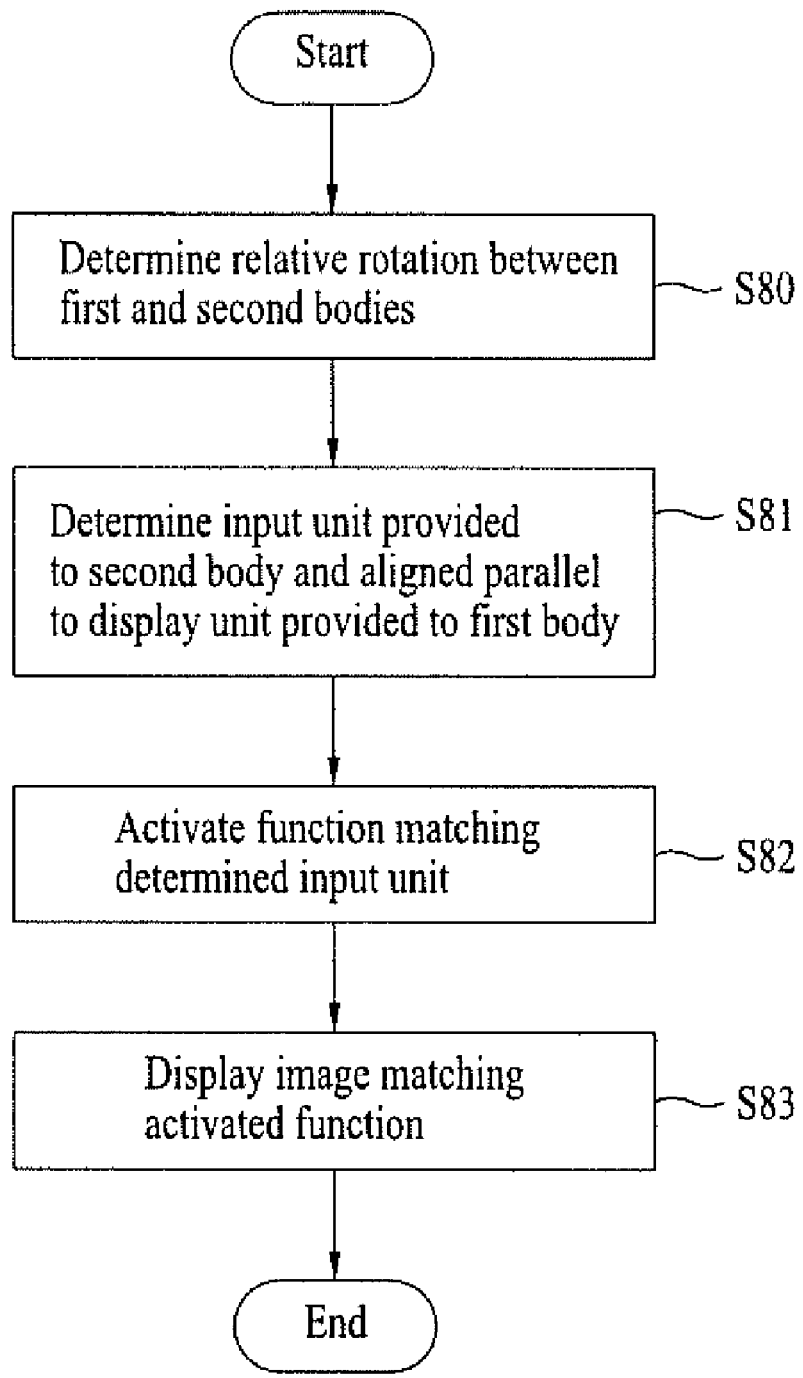
FIG. 8 is a flowchart of a method of changing a function mode in a mobile communication terminal according to another embodiment of the present invention.

With reference to FIG. 8, a method of changing a function mode in a mobile communication terminal according to another embodiment of the present invention is explained in detail below. This method can be implemented by the mobile communication terminal illustrated in FIGS. 1 to 6.

FIG. 8 is a flowchart of a method of changing a function mode in a mobile communication terminal according to another embodiment of the present invention. Referring to FIG. 8, a relative rotation between the first and second bodies 100 and 200 is determined (S80).

An input unit, which is provided to one of the plurality of exposed faces of the second body 200, aligned parallel to a display unit provided to one exposed faces of the first body 100 is determined according to the determined rotation angle (S81). A function mode matching the detected input unit is activated (S82). And, the image matching the activated function mode is displayed on the display unit 111 (S83).

Accordingly, a mobile communication terminal and method of changing a function mode according to the present invention provides the following effects or advantages. The present invention provides a conceptional user interface capable of changing a function mode according to a body rotation, thereby providing a user with fun and convenient use of the mobile terminal.

Secondly, by changing each function mode differently according to a relative rotation angle and direction between two bodies configuring a terminal, various combinations of function variations can be achieved.

Thirdly, by configuring a cross-section of each body with an equilateral polygon, the present invention facilitates retaining corresponding body configuration of the terminal regardless of a rotation range including a rotation angle and direction of a body. In particular, the terminal can retain and handle in any rotation state without recovering the bodies to original postures after a user has rotated the bodies by a specific angle in a specific direction.

Fourthly, by configuring a cross-section of each body with an equilateral polygon, a plurality of input units suitable for various functions provided by a terminal can be simultaneously provided. Hence, the present invention is able to provide a user with convenience in using the mobile communication terminal.

Finally, the present invention is able to secure a space for assembling/disassembling a detachable function module such as a camera.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile communication terminal comprising:
a first body having a display unit;
a second body;
a connecting part connecting the first and second bodies together to enable the first and second bodies to rotate on a prescribed axis; and
a control unit arranged to change a function according to a rotation angle and a rotation direction between the first and second bodies, and to display an image corresponding to the changed function on the display unit,
wherein the connecting part comprises a 4-way connector system configured to enable the first and second bodies to mutually rotate and change the function,
wherein the 4-way connector system provides four connectors to a 4-way cross section to change a contact point relative to the rotation of the first and second bodies,
wherein correspondent faces of the connected first and second bodies are configured as an equal sized equilateral polygon,
wherein a plurality of different input units are provided on exposed faces of the second body,
wherein a different function corresponds to each of a plurality of relative rotation angles and rotation directions between the first and second bodies,
wherein the different function corresponding to each of the plurality of relative rotation angles and rotation directions is activated when the first body is flush with the second body, and
wherein the first body and second body may each be rotated to at least four positions.

2. The mobile communication terminal of claim 1, further comprising a fixing structure to align the first body and second body when the first body is flush with the second body.

3. The mobile communication terminal of claim 1, wherein the second body comprises at least one display unit.

4. The mobile communication terminal of claim 1, further comprising a rotation detection unit configured to determine the rotation angle between the first and second bodies.

5. The mobile communication terminal of claim 4, wherein the rotation detection unit is provided in at least one of the first body, second body and connecting part.

6. The mobile communication terminal of claim 1, wherein the correspondent faces of the connected first and second bodies are configured as an equal sized square and wherein the control unit changes the function mode when the second body is rotated by 90° or 180° in a left or right direction.

7. A method of changing a function in a mobile communication terminal having a first body and a second body rotatably connected against each other by 360° centering on a prescribed axis, the method comprising:
detecting a relative rotation angle and rotation direction between the first and second bodies; and
displaying an image on a display unit of the first body according to the detected rotation angle and rotation direction,
wherein the image is displayed according to a function mode corresponding to the detected relative rotation angle and rotation direction,
wherein correspondent faces of the first body and the second body are equal sized equilateral polygons,
wherein the first body and the second body are connected against each other via a 4-way connector system configured to enable the first and second bodies to mutually rotate and change a function, the 4-way connector system providing four connectors to a 4-way cross section to change a contact point relative to the rotation of the first and second bodies,
wherein the different function corresponding to each of the plurality of relative rotation angles and rotation directions is activated when the first body is flush with the second body, and
wherein the first body and second body may each be rotated to at least four positions.

8. The method of claim 7, further comprising:
determining that an input unit provided on one of a plurality of exposed faces of the second body is aligned parallel to a display unit, the display unit being provided to one of a plurality of exposed faces of the first body; and
activating a function corresponding to the determined input unit.

9. A mobile communication terminal, comprising:
a first body having a display unit;

a second body comprising an input unit having a prescribed function assigned thereto, the input unit provided to at least one of a plurality of exposed faces of the second body;

a connecting part connecting the first and second bodies together to enable the first and second bodies to rotate by 360° centering on a prescribed axis;

a control unit arranged to activate the prescribed function assigned to the input unit or the display unit according to a relative rotation between the first and second bodies; and a rotation detection unit configured to detect a rotation angle between the first and second bodies;

wherein the connecting part comprises a 4-way connector system configured to enable the first and second bodies to mutually rotate and change the prescribed function, the 4-way connector system providing four connectors to a 4-way cross section to change a contact point relative to the rotation of the first and second bodies, wherein the first body and second body may each be rotated to at least four positions, wherein correspondent faces of the first body and the second body are equal sized equilateral polygons, wherein the control unit changes the function when the second body is rotated by 90° or 180° in a left or right direction, wherein the display unit displays an image according to a function corresponding to the detected relative rotation angle and the rotation direction, and wherein the prescribed function is activated when the first body is flush with the second body.

\* \* \* \* \*